United States Patent [19]

Shultz

[11] Patent Number: 4,666,696

[45] **Date of Patent: * May 19, 1987**

[54] DESTRUCTION OF NERVE GASES AND OTHER CHOLINESTERASE INHIBITORS BY MOLTEN METAL REDUCTION

[75] Inventor: Clifford G. Shultz, Evansville, Ind.

[73] Assignee: Detox International Corporation, St. Charles, Ill.

[ * ] Notice: The portion of the term of this patent subsequent to Nov. 12, 2002 has been disclaimed.

[21] Appl. No.: 717,932

[22] Filed: Mar. 29, 1985

[51] Int. Cl.$^4$ ....................... B01D 53/34; B01D 47/02; C02F 1/70; C01D 3/00

[52] U.S. Cl. .................................... 423/659; 423/245; 423/210.5; 423/299; 423/322; 423/DIG. 12; 110/237; 210/906; 210/909

[58] Field of Search ........... 423/245, 299, 322, 210 C, 423/210.5, DIG. 12, 659; 110/237; 210/906, 909

[56] References Cited

U.S. PATENT DOCUMENTS

| | | | |
|---|---|---|---|
| 3,343,911 | 9/1967 | Eisenlohr | 423/495 |
| 3,845,190 | 10/1974 | Yosim et al. | 423/184 |
| 4,230,053 | 10/1980 | Deardorff et al. | 110/237 |
| 4,246,255 | 1/1981 | Grantham | 423/210.5 |
| 4,352,332 | 10/1982 | Baston | 110/237 |
| 4,440,566 | 8/1983 | Colon | 585/359 |
| 4,447,262 | 5/1984 | Gay et al. | 423/DIG. 12 |
| 4,469,661 | 9/1984 | Shultz | 423/210.5 |
| 4,477,373 | 10/1984 | Grantham et al. | 423/210.5 |
| 4,497,782 | 2/1985 | Howell et al. | 423/DIG. 12 |
| 4,552,667 | 11/1985 | Shultz | 210/757 |
| 4,599,141 | 7/1986 | Shultz . | |

FOREIGN PATENT DOCUMENTS

| | | | |
|---|---|---|---|
| 61411 | 9/1982 | European Pat. Off. | 75/68 C |
| 49-94562 | 1/1974 | Japan | 423/DIG. 12 |
| 51-25471 | 3/1976 | Japan . | |
| 52-57149 | 5/1977 | Japan | 423/DIG. 12 |

OTHER PUBLICATIONS

Shultz U.S. Ser. No. 638,501, filed 8/7/84.

Shultz U.S. Ser. No. 809,976, filed 12/17/85.

Shultz Ser. No. 714,738 filed Mar. 22, 1985.

Arita, H., *Chemical Abstracts,* 85: 82963h, 1976.

Article from p. A13 of 3/14/85 Washington Post titled "Nerve Gas Weapons Aging".

*Primary Examiner*—Gary P. Straub

[57] ABSTRACT

Cholinesterase inhibiting agents such as nerve gas agents and pesticide agents are destroyed by reaction with molten aluminum and the gaseous products are analyzed and recycled if they are not essentially free of such agents.

6 Claims, 5 Drawing Figures

DESTRUCTION OF NERVE GASES AND OTHER CHOLINESTERASE INHIBITORS BY MOLTEN METAL REDUCTION

TECHNICAL FIELD

This invention is directed to destroying cholinesterase inhibitors including nerve gas agents and insecticides comprising substituted or unsubstituted phosphoric or thiophosphoric acid esters or thioesters.

BACKGROUND OF THE INVENTION

In its efforts to always maintain a strong national defense arsenal, the United States has manufactured a number of chemical weapons. Among the most terrifying of these are the so-called "nerve gases". These agents attack cholinesterase, an enzyme which is associated with all neural tissue. They are lethal at very low concentrations, and react very quickly.

Large quantities of these agents are now normally stored by the Army in liquid form for possible use in a future war. However, some of the inventory represents a safety hazard to Army personnel. Some of these gases have been stored for decades in vessels which were not designed for long-term use. Some have deteriorated and are no longer usable. Thus far, efforts to destroy these compounds have been frustrated by the inability of destruction processes to completely destroy the agents.

Insecticides which are based upon substituted or unsubstituted phosphoric and thiophosphoric acid, and especially off-grade products or waste materials generated during the manufacture of these products also present destruction problems. These compounds are also cholinesterase inhibitors, although not as highly toxic as the military nerve gases. Recently, one of these compounds, Parathion, was banned from the marketplace by the Federal government; the existing inventory of this compound, and any waste products generated in its manufacture must be destroyed.

Two methods have been considered for destroying these agents. One of these involves holding them at 1000° F. for a period of fifteen minutes. To accomplish this requires a pressure vessel, and entails a batch-wise process. The other destruction method involves incineration. The incineration process requires not only residence time at or above the ignition temperature, but also requires combustion gases, to provide an excess of oxygen for complete combustion.

These agents contain phosphorus, oxygen, carbon and hydrogen, and can contain nitrogen, sulfur or fluorine. If these compounds are incinerated, the combustion products include not only carbon dioxide and water, which are harmless; but nitric oxides, sulfur oxides, phosphorus oxides and hydrogen fluoride. The combustion gases must be scrubbed clean of these latter products and unreacted agent and unreacted agent accumulated in the scrubber provides a disposal problem. Furthermore, conventional incinerators are not useful since they do not contain means to recapture and recycle the gases. As a result, if some agent passes through the incinerator unaffected, it will be discharged to the environment.

SUMMARY OF THE INVENTION

This invention is applicable to the destruction of cholinesterase inhibitor agents, including nerve gas agents and insecticides, comprising substituted or unsubstituted phosphoric or thiophosphoric acid esters or thioesters in a safe, inexpensive manner, without resorting to combustion processes; and in a manner which makes possible the containment of all reaction products for analysis and possible use. If destruction is not complete, the reaction products can be recycled through the system.

The process comprises the steps of contacting said cholinesterase inhibitor agents in vapor form in a reaction zone with molten metal comprising aluminum to react said agents with said aluminum to form inorganic aluminum compounds, phosphorus, and lower alkene (i.e. $C_2$–$C_6$ alkene), and in some cases acetylene, hydrogen, carbon, and ammonia (if nitrogen is present in the agent being destroyed) and recovering the alkene and any acetylene, ammonia and hydrogen as a gas, analyzing the recovered gas for presence of agent being destroyed, recycling recovered gas which the analysis shows is not free of said agents, and optionally using recovered gas which is free of said agents for the production of energy.

DETAILED DESCRIPTION

Figure 1:
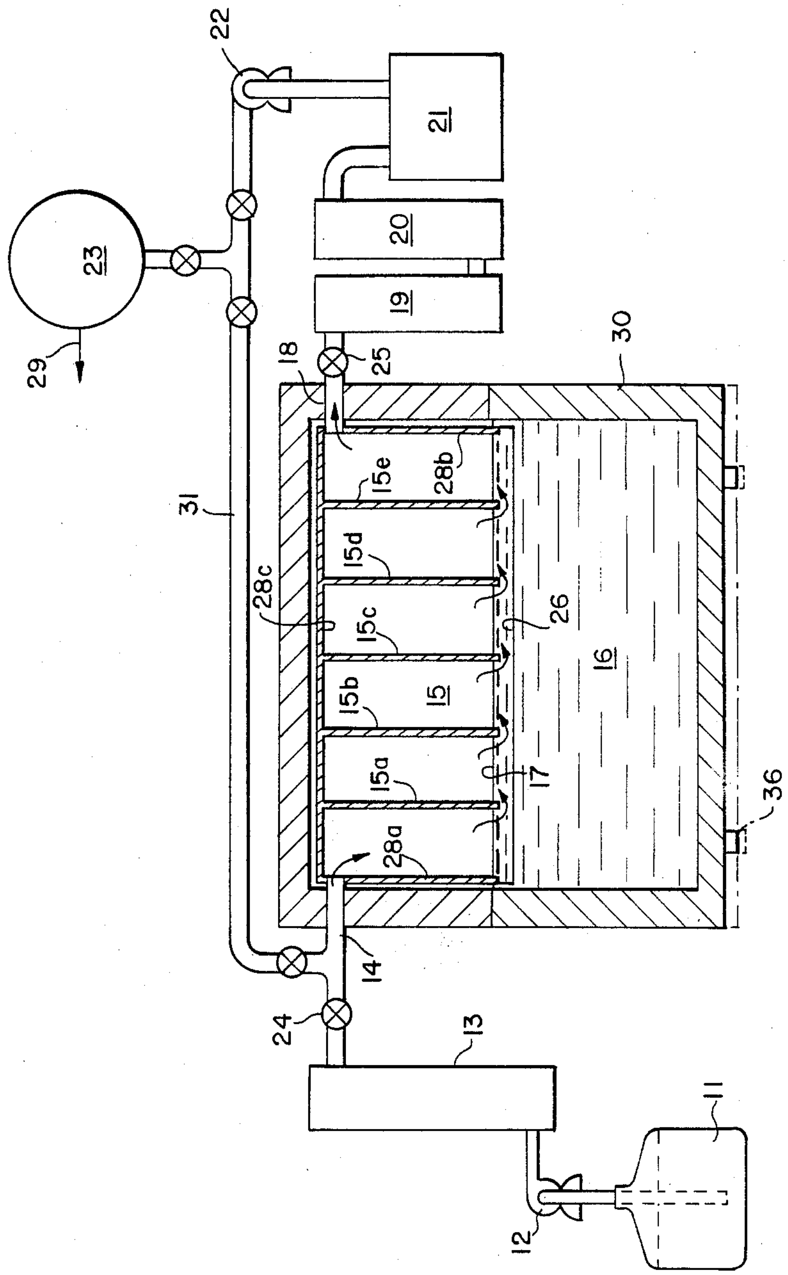
FIG. 1 schematically illustrates a preferred system for carrying out the process of the invention with portions depicted in section.

The agents which can be destroyed by the process herein contain linkages as follows:

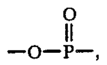 (I)

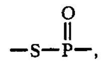 (II)

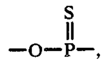 (III)

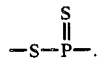 (IV)

The agents which can be destroyed by the process herein include for example the nerve gas agents sarin, tabun, soman and VX, and the pesticides, i.e. insecticides, methyl parathion, parathion, malathion, diazinon, and paraoxon.

It has been found herein that molten aluminum provides a reducing effect when brought into contact with said cholinesterase inhibitor agents and destroys their cholinesterase inhibiting ability. The reduction converts the phosphorus in the agents to elemental phosphorus and in some cases to aluminum phosphide. This reduction of the phosphorus destroys the ability of the agent to provide cholinesterase inhibiting effect.

As indicated above, the reaction results in formation of inorganic aluminum compounds. The constitution of the aluminum compounds depends on the chemical constitution of the agent being subjected to treatment. Aluminum oxide, i.e. $Al_2O_3$, is formed in all cases. Aluminum phosphide can be formed in some cases. Where the agent contains fluorine, e.g. in the case of sarin, i.e. GB, or soman, aluminum fluoride is formed. Where the agent contains sulfur, e.g. in the case of VX, methyl parathion, parathion, malathion, and diazinon, aluminum sulfide is formed. The inorganic aluminum compounds and the reaction product carbon forms a dross or slag and are readily skimmed from the melt periodically when the reactor is in a non-reacting mode.

The gaseous product from the process normally comprises phosphorus, lower alkenes, and usually hydrogen, and in some cases acetylene, and nitrogen or ammonia (if the agent contains nitrogen). The phosphorus is condensed, e.g. in a trap. The remaining gases are recovered and sampled, and the sample is analyzed. If the sample is free of agent being destroyed, i.e. contains less than 0.01 part per million (ppm) of said agent, the alkene, acetylene (if any) and hydrogen is recovered from the gaseous product and can be used to produce energy, preferably by burning in a furnace to provide heat to preheat the feed.

Reaction equations for the destruction of various cholinesterase inhibiting agents by the method herein are set forth below.

The following is the reaction equation for the destruction by the process herein of sarin, i.e. GB

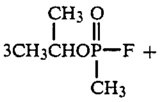

$+ 5Al \longrightarrow$ $6H_2 + 3C + 3CH_3{-}CH{=}CH_2 + 2Al_2O_3 + AlF_3 + 3P$

The following is the reaction equation for the destruction by the process herein of soman

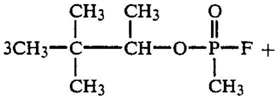

$+ 5Al \longrightarrow$

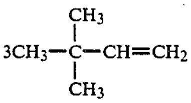

$+ 6H_2 + 2Al_2O_3 + 3P + AlF_3 + 3C$

The following is a reaction equation for the destruction by the process herein of tabun

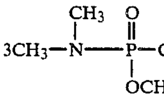

$+ 4Al \longrightarrow 3CH_2{=}CH_2 + 6NH_3 + 9C + 2Al_2O_3 + 3P + 1\frac{1}{2}H_2$ The following is a reaction equation for the destruction by the process herein of VX

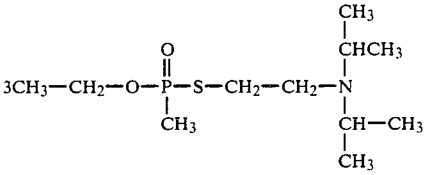

$+ 4Al \longrightarrow 6CH_2{=}CH_2 + 6CH_2{=}CH{-}CH_3 + 3P + 4\frac{1}{2}H_2 + 3C + 3NH_3 + 2Al_2O_3 + Al_2S_3$ The following is the reaction equation for the destruction by the process herein of malathion

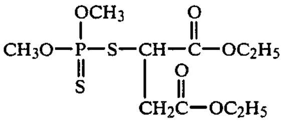

$+ 5\frac{1}{3}AL \longrightarrow$ $CH{\equiv}CH + 2CH_2{=}CH_2 + 4\frac{1}{2}H_2 + P + 4C + \frac{2}{3}Al_2S_3 + 2Al_2O_3$ The following is the reaction equation for the destruction by the process herein of parathion

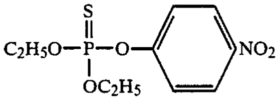

$+ 4Al \longrightarrow$ $2CH{\equiv}CH + 2CH_2{=}CH_2 + \frac{1}{2}N_2 + H_2 + 2C + P + 1\frac{2}{3}Al_2O_3 + \frac{1}{3}Al_2S_3$ The following is the reaction equation for the destruction by the process herein of diazinon

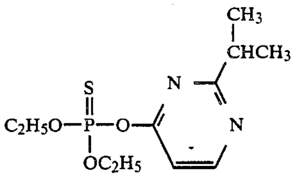

$+ 2\frac{2}{3}Al \longrightarrow$ $CH{\equiv}CH + CH_2{=}CH{-}CH_3 + 2CH_2{=}CH_2 + NH_3 + \frac{1}{2}N_2 + Al_2O_3 + \frac{1}{3}Al_2S_3 + 3C + H_2 + P$ The following is the reaction equation for the destruction by the process herein of paraoxon

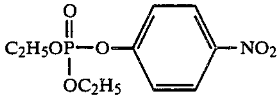

$+ 4Al \longrightarrow 2CH{\equiv}CH + 2CH_2{=}CH_2 + \frac{1}{2}N_2 + H_2 + 2C + P + 2Al_2O_3$ It is to be understood that while the reaction products depicted are the principal products, minor quantities of other products, can be formed, for example by recombination of fragments of the degraded molecules.

While the use of pure molten metal is preferred, aluminum alloys or recovered scrap metal containing metallic impurities or a eutectic melt can also be used.

The temperature of the melt is not critical so long as the metal remains molten. Where the molten bath is substantially completely aluminum, temperatures ranging from about 680° C. to about 2300° C. are ordinarily useful and temperatures ranging from about 780° C. to about 1000° C. are preferred. Increasing of temperature results in diminished molten metal viscosity which in turn results in better contact between metal and agent being destroyed and a higher rate of reduction. The use of higher temperatures requires construction materials and equipment resistant to these temperatures and the strongly reducing atmosphere. Temperatures near the boiling point of aluminum should be avoided, especially when treating an agent which reacts exothermally with the metal, since localized heating can result in vaporization of a small amount of the metal whereby violent reaction can occur. While the same reactions take place below the melting point of aluminum such reactions are incomplete due to coating of the metal surface with a passivating oxide coating. Use of a molten bath, on the other hand, presents a continuously renewed reactive surface.

As previously indicated FIG. 1 of the drawing schematically illustrates a preferred system for carrying out the process of the invention. With continuing reference to FIG. 1, agent in the liquid form in which it is normally stored is pumped from a sealed container 11 by a pump 12 into a preheater chamber 13 where it is heated and converted to vapor. The vaporized agent is forced from preheater chamber 13 through a delivery tube 14 into the first compartment of a reactor 15 which comprises a series of baffles (15*a*, 15*b*, 15*c*, 15*d*, 15*e*) enclosed in an open bottom box having front wall 28*a*, rear wall 28*b*, top wall 28*c* and as depicted in FIGS. 2*b* and 2*c*, rear sidewall 28*d* and front sidewall 28*e*. The number of baffles is a matter of choice and is selected empirically to obtain substantially complete destruction. Normally, the number of baffles ranges from 4 to 10. The rear sidewall 28*d* contains a lip 26 in its lower portion. The reactor 15 is positioned in a refractory lined furnace chamber 30 (the refractory lining is not depicted) containing in its lower portion a bath of molten aluminum 16 with lower edges of the baffles 15*a*, 15*b*, etc. approximately one-half inch below the surface 17 of the molten aluminum. The vapors pass from one compartment to the next by passing under the baffle between them and through the molten aluminum.

As the vapors pass under the baffles 15*a*, 15*b*, etc. and through the bath of molten aluminum 16, the agent reacts with the metal to form aluminum oxide, sulfide or fluoride; phoshorus (or aluminum phosphide); low-molecular weight organic compounds, i.e. alkenes; hydrogen; and in some cases, acetylene, carbon, and nitrogen or ammonia (if nitrogen is present in the agent). The aluminum oxide and other aluminum salts, and the carbon, remain in the compartments of reactor 15 or dissolved in the metal 16. The vapors are exhausted from the reactor through exit pipe 18 to a condensor 19 which is held at a temperature below the melting point of phosphorus (590° C.) to condense the phosphorus. The remaining gases are cooled in a heat exchanger 20 and are trapped in a low pressure gas storage container 21. As necessary to maintain a constant back pressure, compressor 22 compresses the gases into storage container 23 from where such can be withdrawn as indicated by arrow 29 to be analyzed.

After sampling and analysis to determine that the gases are free of unreacted agent, they can be withdrawn from container 23 as indicated by arrow 29 and flared off, or utilized as fuel, for example, by burning in the furnace (not depicted) associated with preheater 13. If any agent to be destroyed is present at a level of 0.01 ppm or above, the gases can be recycled through the system through return pipe 31.

Figure 2A:
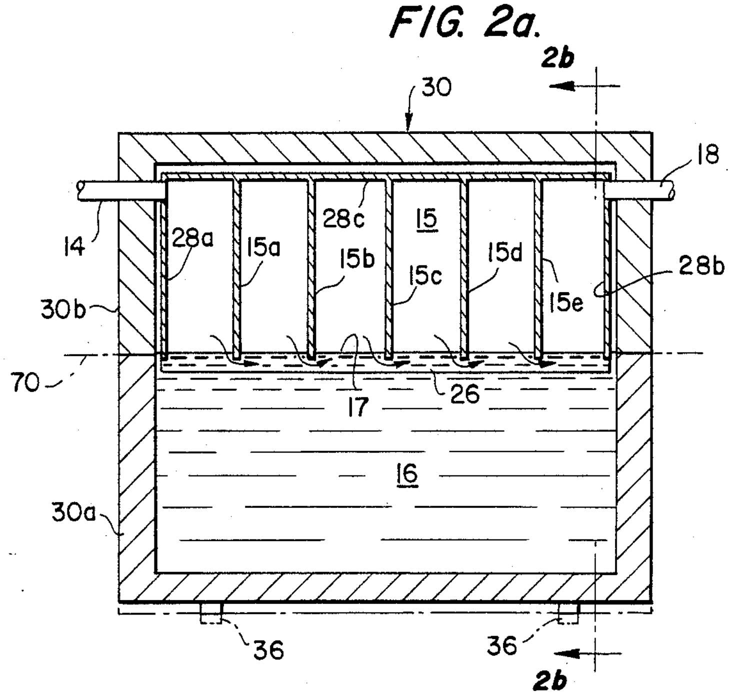
FIG. 2 schematically illustrates detail of the reactor, aluminum bath container, and associated structure of the system of FIG. 1. FIG. *2a* is a sectional side view. FIG. *2b* is a sectional along line *2b*—*2b* of FIG. *2a*. FIG. *2c* is a sectional view along line *2c*—*2c* of FIG. *2b*.
Figure 2B:
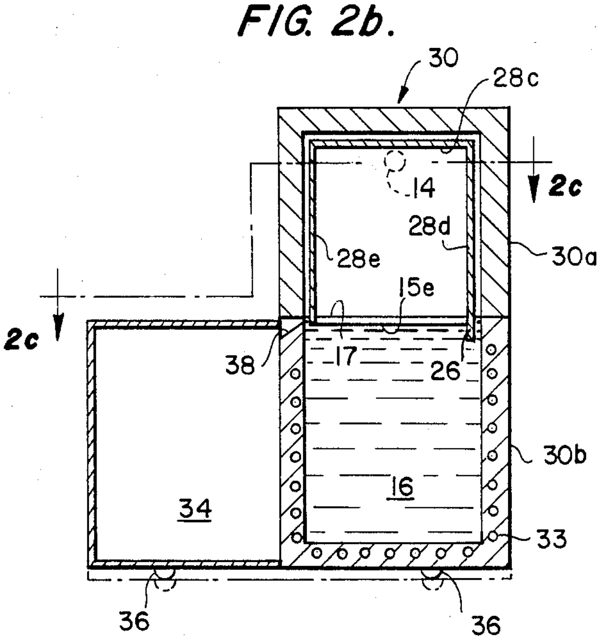
Figure 2C:
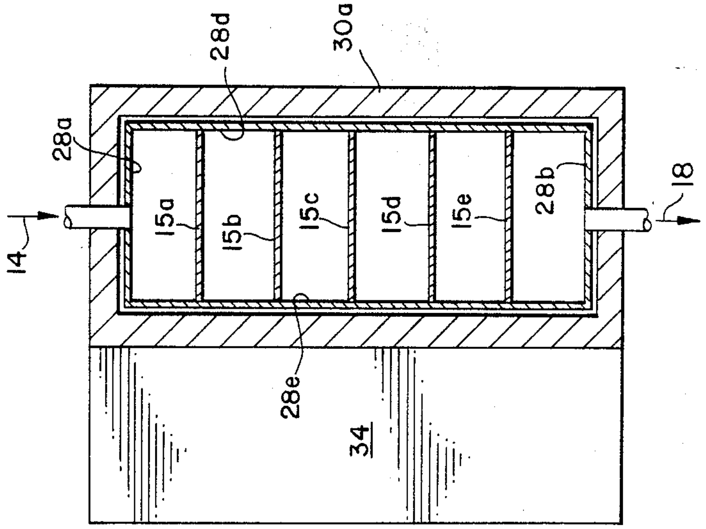

The structure of the reactor 15, furnace chamber 30 and associated structure is depicted in detail in FIG. 2. The reactor 15 is suspended from above by structure not depicted and in normal use is positioned in the refractory lined furnace chamber 30 so that the lower portions of baffles 15*a*, 15*b*, etc. are immersed in molten aluminum bath 16. The chamber 30 contains an upper portion 30*a* which is separable from a lower portion 30*b* along a parting line 70 (FIG. 2*a*). The walls of lower portion 30*b* contain electric heating elements 33 to melt solid aluminum and to maintain the bath 16 in molten condition. A dross box 34 is along side chamber 30 in assembly therewith. The dross box 34/chamber 30 assembly is on wheels 36 which are supported on a vertically movable platform not shown. The position of the wheels and lower wall of the dross box 34/container 30 assembly when the platform is moved to a down position are shown in phantom.

With reference to FIGS. 1 and 2, for dross removal, repair, or maintenance, the reactor 15 is allowed to stand for at least fifteen minutes with inlet and exhaust valves 24 and 25 closed to allow the thermal decomposition of any unreacted agent in the system. To remove dross, the platform holding the dross box 34/chamber 30 assembly is lowered approximately one inch so that baffles 15*a*, 15*b*, etc. clear the upper end of lower portion 30*b* of chamber 30 and the assembly of dross box 34 and lower portion 30*b* is rolled in a direction that causes the lip 26 to drag the dross off the aluminum bath surface 17 to scrape the dross over the dam 38 (FIG. 2*b*) associated with the front sidewall of portion 30*b* so that the dross falls into the dross box 34. The bath 16 can be supplied with aluminum to replace that which has reacted when such rolling exposes access to lower portion 30*b* of chamber 30. The dross box 34/portion 30*b* assembly is then returned to its operating location and raised to again immerse the edges of the baffles in the molten metal.

The use of a series of baffles in molten metal is only one alternative. Other types of reactors can be used. A round bell-type reactor with an inlet extending under the metal surface, and outlet at the top is an alternate configuration. Other types of reactors can be used. Other means of agent introduction can be used, including a plenum with multiple tubes feeding under the surface of the molten metal, injection of the agent into a large skirt with the open end under the surface of a molten metal bath; sparging agent through porous plugs or a porous bottom in the reactor; or by tubes feeding at various angles from the top or sides of the reactor.

The following examples illustrate the invention.

Figure 3:
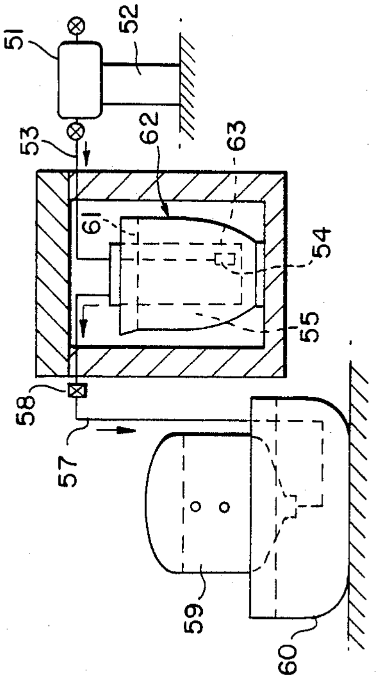
FIG. 3 schematically depicts a system for destroying liquid agents which is used in the working examples herein; portions are depicted in section.

In Examples I and II a system is utilized as depicted in FIG. 3. With reference to FIG. 3, the system comprises a preheater chamber 51 which is heated by a furnace 52 to vaporize agent to be destroyed which is supplied to chamber 51. The vaporized material is forced through line 53 through a sparger 54 which is located under surface 61 of molten aluminum bath 55 which is contained in crucible 62. The vaporized agent passes through and reacts with the molten aluminum in bell reactor 63. The gaseous reaction products rise to the top portion of the bell reactor 63 and exit via discharge line 57 under the mouth of water trap 59 which is positioned in reservoir 60. The discharge line 57 is equipped with a check valve 58 to prevent water from siphoning into reactor 63.

A system as depicted in FIGS. 1 and 2 is utilized for Examples III and IV.

We turn now to the working examples which are illustrative of the invention.

EXAMPLE I

A 25 ml sample of malathion pesticide formulation, which contained 15 g of malathion and 9.5 g of xylene, was vaporized in the preheater and the vapors sparged into the molten aluminum bath which was at 870° C. It passed through six to twelve inches of aluminum, and the gaseous products were trapped in the water trap by displacement of water. The total vapor produced amounted to 16.6 liters. A volume of 19.2 liters was calculated to be the total volume based upon reactions which assume the total decomposition of the xylene. No detectable malathion remained in the vapors.

An oily residue was found to contain sixteen (16) micrograms. This represents 1.1 part per million of the original malathion. Phosphorus was identified in the aluminum bath, the slag and in the trap water. Sulfide ion was detected in both the aluminum bath and the dross formed thereon. The oily residue can be recycled to reduce or essentially eliminate the residual malathion.

EXAMPLE II

A 25 ml sample of methyl parathion was vaporized in the preheater and the vapors were passed through molten aluminum at 720° C. A total of 8.3 liters of gas were trapped over water in the water trap. A black material, later found to be carbon, and an oily material similar in appearance to that obtained in the malathion reaction, were recovered. The trapped gas was analyzed by gas chromatography. The chart showed fourteen compounds that were not present in the methyl parathion formulation. No methyl parathion was detected in the gases. In the oily residue, methyl parathion was detected equivalent to 25 parts per trillion. Ammonia and acetylene were detected in gases released from the slag upon exposure to moisture.

EXAMPLE III

One hundred pounds of soman is sealed in the supply container and pumped through the preheater and the formed vapors passed through the reactor at the rate of sixteen pounds per hour and contacted with molten aluminum at 850° C. Fifteen pounds of phosphorus are condensed in the first condenser. Most of the other vapors condense to liquid upon further cooling, leaving only fifteen cubic feet of gas. The liquid is sampled with a syringe and analyzed by gas chromatography. It is found to consist predominantly of 3,3-dimethyl butene. The total volume produced is 11.5 gallons (compared to 12.7 gallons theoretical yield if all the product was 3,3-dimethyl butene). The liquid and vapors show less than 1 part per billion of soman.

Approximately 150 pounds of slag is formed. This contains some aluminum metal, and no satisfactory separation method exists. This also complicates the sampling. The slag is found to contain aluminum oxide, carbon, aluminum fluoride, and aluminum phosphide.

A sample of metal is dipped from the molten bath and poured into a mold for analysis. Cuttings from the metal are dissolved in acid and the escaping gases collected. The gas shows the presence of phosphine, $PH_3$. The solution is found to contain fluoride ion, confirming the formation of aluminum fluoride.

EXAMPLE IV

A charge of fifty pounds of VX is vaporized and passed through the system at the rate of ten pounds per hour. The molten aluminum temperature is 800° C. Four hundred thirty three cubic feet of gases are formed, including ammonia, hydrogen, ethylene and propylene. The vapor shows gas chromatographic peaks corresponding to fifteen different compounds, with the hydrogen, ethylene, propylene and ammonia predominating. The vapor shows less than 1 part per billion of VX.

The first condenser yields 5.2 pounds of phosphorus. The slag weighs 24 pounds, and consists of carbon, aluminum oxide, aluminum sulfide, and aluminum phosphide. Aluminum sulfide and aluminum phosphide are also found in the metal.

Similar results to those obtained in Example IV of less than 1 part per billion of agent is obtained in Example IV, when an equal weight of tabun or sarin or parathion or diazinon or paraoxon is substituted for the VX.

While the foregoing describes preferred embodiments, modifications within the scope of the invention will be evident to those skilled in the art.

For example, solid material is readily treated by placing such in an aluminum tube and sealing to form a capsule, fastening the capsule with a screw to a pipe welded to an open end of a larger pipe which is capped at the other end where it communicates with an exit pipe, lowering the assembly into a bath of molten aluminum contained in a crucible so that the aluminum tube is immersed in the molten aluminum and melts whereby the solid material reacts with the molten aluminum and recovering the gaseous products leaving via an exit pipe in a water trap.

Thus, the scope of the invention is intended to be defined by the claims.

What is claimed is:

1. A process for destroying cholinesterase inhibiting agents comprising substituted or unsubstituted phosphoric acid or thiophosphoric acid esters or thioesters, said process comprising the steps of (a) contacting the agent in vapor form in a reaction zone with molten metal comprising aluminum to react the agent with said aluminum to form at least inorganic aluminum compound, phosphorus and lower alkene and recovering a gaseous product, (b) analyzing the recovered gaseous product for the presence of said agent, (c) recycling recovered gaseous product which the analysis shows is not free of said agent.

2. A process as recited in claim 1 wherein the agent to be destroyed is initially in liquid form and is vaporized in a zone separate from the reaction zone prior to being introduced into the reaction zone.

3. A process as recited in claim 1 wherein said agent is a nerve gas agent.

4. A process as recited in claim 1, wherein said agent is a pesticide.

5. A process as recited in claim 1, where slag is periodically cleaned out.

6. The process of claim 1 comprising destroying substituted or unsubstituted phosphoric acid or thiophosphoric acid esters or thioesters which are free of halogen substituent.

* * * * *